United States Patent Office 2,743,294
Patented Apr. 24, 1956

2,743,294

NEW BIS-ALKYLAMMONIUM ETHERS

Jorgen Fakstorp, Copenhagen, Denmark, assignor to Aktiebolaget Pharmacia, Uppsala, Sweden, a corporation of Sweden No Drawing. Application March 17, 1953,
Serial No. 342,963

Claims priority, application Denmark March 25, 1952

3 Claims. (Cl. 260—501)

This invention relates to the water-soluble, non-toxic salts of a new alkyl ammonium ether which can be represented by the general formula:

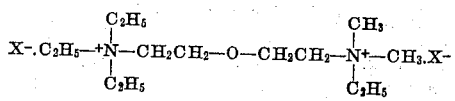

wherein X represents the non-toxic anion of the salt, which may be the acid tartrate or the bromide, for example.

Said new compounds according to the invention have provide to possess a good biological activity, especially as highly potent and useful ganglionic blocking agents. Thus, these ethers have been tested (in the form of their salts) as ganglionic blocking agents and have been found to be very active with respect to their ability to block the transmission across the ganglia of both the sympathic and parasympathic nervous systems.

The prior art discloses bis-alkylammonium hexanes and pentanes as ganglionic blocking agents. However, for example, the triethylammoniumethyl-dimethylethylammoniumethyl ether bis-monohydrogen tartrate, a preferred compound according to the invention, is active in blocking the transmission across the superior cervical ganglion of the cat, as shown by its ability to prevent the nictitating membrane contraction evoked by electrical stimulation of the said ganglion, even in a concentration less than two thirds of that required by hexamethonium bromide, a commonly used agent of said prior known type.

The free hydroxides of the compounds according to the invention are rather unstable crystalline or glasslike solids, which are very soluble in water and in polar organic solvents. They form salts readily with two equivalents of an acid. These salts are readily soluble in water and less readily soluble in polar organic solvents, they are sparingly soluble in non-polar organic solvents. Among the acids which may be used to form salts of these organic quaternary ammonium hydroxides are inorganic acids such as hydrochloric, hydrobromic, hydroiodic, sulfuric, phosphoric, and strong organic acids such as alkylsulfuric, arylsulfonic, citric, tartaric, lactic, fumaric, maleic and similar acids which in therapeutic dosages provide non-toxic anions.

The salts according to the invention may be prepared, for example, by the interaction of sodium dimethylamino-ethoxide with diethylaminoethyl chloride followed by quaternization of the resulting 2-dimethylaminoethyl-2'-diethylaminoethyl ether with a reactive ethylating agent, such as diethylsulfate or ethyl bromide.

The hydroxides may be set free from their salts by means of appropriate reagents, such as silver oxide, barium hydroxide, or by hydrolysis with sulfuric acid followed by a treatment with barium hydroxide. From the free hydroxides the salts may be prepared by interaction of the equivalent amounts of the appropriate acids, suitably in aqueous solution.

A preferred manner of carrying out the invention in practise is by heating together in a non-polar solvent of sufficiently high boiling point, e. g. toluene, sodium alkoxides, prepared by interaction of the appropriate aminoalcohol by direct reaction with sodium, with sodium hydride, or with finely powdered sodium hydroxide, with chlorides, prepared from the hydrochloride of the appropriate aminoalkyl chloride by saponification with aqueous alkali, extraction with toluene and drying of the toluene extract, immediately prior to use, and isolating the bis-tertiary alkyl amine either by distillation or by precipitating it as a salt e. g. the hydrochloride.

It has been found convenient to heat or to keep a room temperature depending on the boiling point of the reagents, when reacting the appropriate bis-tertiary ether, together with an appropriate alkyl bromide, alkyl iodide, alkyl sulfate or alkyl sulfonate, in a solvent, preferably acetone, benzene, toluene and ethyl ether, or mixtures of these and containing varying amounts of alcohol to facilitate the alkylation reaction.

In carrying out the invention the following amino-alcohols may suitably be used: dimethylaminoethanol and diethylaminoethanol.

Suitable aminoalkyl halides are especially: dimethyl-aminoethylchloride or the corresponding bromide.

Further, use may preferably be made of the following reactive alkylating agents: methyl iodide, ethyl bromide, dimethylsulfate and diethylsulfate.

The following examples illustrate in more detail my invention without, however, limiting it in scope or spirit.

*Example 1*

An alkoxide is prepared from 117 g. of diethylamino-ethanol dissolved in 500 ml. of toluene, by addition of 23 g. of sodium, while heating the mixture under reflux. When the sodium has dissolved, a solution of 108 g. of dimethylaminoethylchloride in 500 ml. of toluene is added at once, and the mixture is heated under reflux for the following 4 hours. Sodium chloride, formed in the reaction, is removed by filtration. The toluene is removed by evaporation and the residue is distilled under reduced pressure. 2-diethylaminoethyl-2'-dimethylaminoethylether distills at 103° C. at 15 mm. pressure. Analysis of a sample of the base showed 64.1% carbon, 12.7% hydrogen and 14.9% nitrogen: the calculated values are 63.8% carbon, 12.8% hydrogen and 14.9% nitrogen. 94 g. of the compound

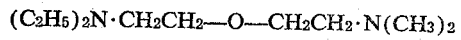

is dissolved in a mixture of 70 ml. of acetone and 30 ml. of anhydrous ethanol, to which solution is added under stirring and external cooling 170 g. of methyl iodide dissolved in 250 ml. of acetone. A vigorous reaction ensues and 110 g. of the bis-methoiodide of 2-dimethylamino-ethyl-2'-diethylaminoethylether is precipitated as a white crystalline mass, which is removed on a filter and dried in the air. This compound has a melting point of 256° C. After washing twice with 300 ml. of acetone, it has the melting point of 262° C.

If 162 g. of ethyl bromide is used in lieu of the methyl-iodide, there is obtained after 6 days at room temperature 125 g. of the bis-ethylbromide of 2-dimethylaminoethyl-2'-dimethylaminoethyl ether with a melting point of 248° C. When recrystallized from a mixture of methanol-ethanol (1:1) the melting point is raised to 261° C.

*Example 2*

In an atmosphere of dry nitrogen a solution of 89 g. of dimethylaminoethanol dissolved in 300 ml. of dry toluene is added dropwise to a stirred boiling suspension of 24 g. of sodium hydride in 100 ml. of dry toluene. After all the sodium hydride has reacted, a solution of diethylaminoethyl chloride in toluene, prepared from 172 g. of diethylaminoethyl chloride hydrochloride, is added, and the mixture refluxed for 16 hours.

After removal of salt and toluene, as described in Example 1, the 2-dimethylaminoethyl-2'-diethylaminoethyl ether is distilled at reduced pressure, as described in Example 1.

90 g. of the above product is mixed with 106 g. diethyl sulfate while stirring and cooling externally. After the first ¼ has been added, a vigorous reaction starts and the mixture becomes solid. The product is then removed from the reaction vessel and dispersed in ether, filtered and crystallized from acetone. The bis-ethosulfate has the melting point of 80° C., and analysis of a sample showed 5.63% nitrogen; the calculated amount is 5.64% nitrogen.

118 g. of this bis-ethosulfate is dissolved in 500 ml. of 25% sulfuric acid and boiled with reflux for several hours. The sulfuric acid is neutralized with the equivalent amount of barium hydroxide, dissolved in 2 liters of hot water, the barium sulfate removed by filtration and the reaction mixture evaporated to a final volume of 700 ml.

To 400 ml. of the above solution is added 240 ml. of a 1 N solution of tartaric acid. The water is evaporated in vacuum and the residual oil triturated with dry acetone, until it crystallizes; the acid bis-tartrate crystallizes with one mole of water which is removed by keeping the salt over concentrated sulfuric acid in vacuum. This tartrate has the melting point 182° C.

What I claim is:

1. The non-toxic salts of a new alkyl ammonium ether having the general formula:

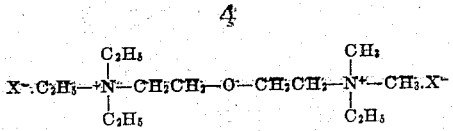

wherein X⁻ represents a non-toxic anion forming a water-soluble non-toxic salt.

2. The new compound 2-dimethylethylammoniumethyl-2'-triethylammoniumethyl ether bis-monohydrogentartrate.

3. As a new product, the bis-ethobromide of 2-dimethylaminoethyl-2'-diethylaminoethyl ether.

References Cited in the file of this patent

FOREIGN PATENTS 511,219    Belgium _____ May 31, 1952

OTHER REFERENCES

Levis et al.: "Arch. Intern. Pharmacodynamie," vol. 93 (1953), pp. 46–54.

Morrison et al.: "Arch. Intern. Pharmacodynamie," vol. 86 (1951), pp. 203–12.

Paley: "Comptes Rendus Soc. Biol.," vol. 140 (1946), pp. 86–7.

Marxer et al.: "Helv. Chim. Acta," vol. 34 (1951), pp. 924–31.

Ewins: Biochemical Jour., 8, 366–67 (1914).

Kahane et al.: Bull. Soc. Chem. (France) 6, 647–48 (1939).

Kunkel et al.: Fed. Proced. 11, 365 (March 1952).